United States Patent
Lee et al.

(10) Patent No.: US 7,922,079 B2
(45) Date of Patent: Apr. 12, 2011

(54) BULK CHECK ACCEPTOR

(75) Inventors: Woo Ho Lee, Seoul (KR); Jae Hoon Kwak, Anyang-si (KR); Jin Yong Hwang, Seoul (KR); Hee Chang Lee, Suwon-si (KR)

(73) Assignee: Nautilus Hyosung Inc., Seoul (KR)

( * ) Notice: Subject to any disclaimer, the term of this patent is extended or adjusted under 35 U.S.C. 154(b) by 0 days.

(21) Appl. No.: 12/555,548

(22) Filed: Sep. 8, 2009

(65) Prior Publication Data
US 2010/0059586 A1 Mar. 11, 2010

(30) Foreign Application Priority Data
Sep. 9, 2008 (KR) .................. 10-2008-0088866

(51) Int. Cl.
*G06Q 40/00* (2006.01)
*G06F 17/00* (2006.01)
(52) U.S. Cl. ............. 235/379; 235/375; 705/45; 705/43
(58) Field of Classification Search .................. 235/375, 235/379, 380; 705/35–45
See application file for complete search history.

(56) References Cited

U.S. PATENT DOCUMENTS

| | | | |
|---|---|---|---|
| 7,028,888 B2* | 4/2006 | Laskowski | 235/379 |
| 7,240,829 B2* | 7/2007 | Graef et al. | 235/379 |
| 7,416,113 B2* | 8/2008 | VanKirk et al. | 235/379 |
| 2007/0164097 A1* | 7/2007 | Kwak et al. | 235/379 |
| 2007/0181668 A1* | 8/2007 | Kwak et al. | 235/379 |
| 2007/0215692 A1* | 9/2007 | VanKirk et al. | 235/379 |
| 2009/0040263 A1* | 2/2009 | Tomida et al. | 347/19 |

* cited by examiner

*Primary Examiner* — Michael G Lee
*Assistant Examiner* — Matthew Mikels
(74) *Attorney, Agent, or Firm* — Fenwick & West LLP

(57) ABSTRACT

A bulk check acceptor includes: a bundle receiving module for drawing a bundle of checks into an interior of the acceptor when an insertion hole shutter is open, and for transferring the checks on a leaf-by-leaf basis; an automatic alignment module for aligning and transferring the checks transferred on a leaf-by-leaf basis by the bundle receiving module; a recognition module for recognizing information on the checks automatically aligned and transferred by the automatic alignment module; an escrow module for escrowing the checks whose information has been recognized; a print module for endorsing a check which is permitted to be accepted; a rejecting module for discharging a rejected check through the bundle receiving module; and a storage box module for receiving the endorsed check.

10 Claims, 5 Drawing Sheets

BULK CHECK ACCEPTOR

CROSS-REFERENCE(S) TO RELATED APPLICATION(S)

This application claims priority under 35 U.S.C. §119(a) to Korean Patent Application No. 10-2008-0088866, filed on Sep. 9, 2008, which is incorporated by reference herein in its entirety.

FIELD OF THE INVENTION

The present invention relates to a bulk check acceptor, and, more specifically to a bulk check acceptor capable of accepting checks in bundles.

BACKGROUND OF THE INVENTION

Financial automated apparatuses such as CDUs (Cash Dispenser Units) or BRMs (Bill Recycling Machines), are collectively referred to as ATMs (Automated Teller Machines). An ATM has been developed to provide financial services without the need of a clerk or bank teller. Using an ATM, most of financial services other than a face-to-face service are available anytime.

In addition to cash deposit/withdrawal function, an ATM provides various functions, such as card processing, bankbook processing, or check accepting, according to the function of a financial service.

Unlike a bill, a variety of characters are printed on a check with a specific magnetic ink. A check acceptor reads out characters, such as a serial number and face value, printed on a check using MICR (Magnetic Ink Character Reader) and then processes the receipt of the check.

To this end, the check acceptor generally includes an insertion unit for receiving a check, a check alignment unit for aligning the inserted check in a predetermined position, a transfer unit for transferring the aligned check, an MICR unit for reading information on the check, a printing unit of a printer that prints on the rear surface of the check a character string transmitted from a top portion of the check, and a storage unit for sequentially stacking and storing checks that have been subjected to an accepting process.

In the conventional check acceptors configured as above, differently from an ATM that in a bundle accepts a predetermined number of sheets of bills through the insertion unit, however, checks should be inserted to the insertion unit one by one, with aligned in a specific direction, so that the checks may be transferred along a predetermined transfer path and stored in the storage unit. That is, a check should be inserted into the insertion unit in a preset direction for insertion operation, which otherwise is not carried out. Moreover, the number of checks to be inserted is limited.

Therefore, a plurality of checks should be inserted over several times, and this causes the check transaction to be time-consuming and inconvenient.

In addition, whereas the size of a check is constant in Korea, in foreign countries, the size of a check differs from another—for example, a personal check personally issued is different in size from a business check issued by a corporation. Accordingly, the conventional check acceptor cannot transact checks of different size.

SUMMARY OF THE INVENTION

In view of the above, the present invention provides a bulk check acceptor capable of accepting checks in a bundle regardless of a size or direction of the checks.

In accordance with an aspect of the present invention, there is provided a bulk check acceptor including: a bundle receiving module located at a front and lower part of an acceptor body for transferring the checks on a leaf-by-leaf basis when a bundle of checks are inserted into the acceptor; an automatic alignment module located at a rear part of the bundle receiving module for aligning and transferring the checks transferred on a leaf-by-leaf basis by the bundle receiving module; a recognition module located at a rear part of the acceptor body for recognizing information on the checks aligned and transferred by the automatic alignment module; an escrow module located in a center of the acceptor body for escrowing the checks whose information has been recognized; a print module located over the recognition module for endorsing a check which is permitted to be accepted; a rejecting module located under the automatic alignment unit for discharging a rejected check through the bundle receiving module; and a storage box module located at a front and upper part of the acceptor body for receiving the endorsed check.

BRIEF DESCRIPTION OF THE DRAWINGS

The above features of the present invention will become apparent from the following description of embodiments given in conjunction with the accompanying drawings, in which.

DETAILED DESCRIPTION OF THE EMBODIMENTS

Hereinafter, exemplary embodiments of the present invention will be described in detail with reference to the accompanying drawings.

Figure 1:
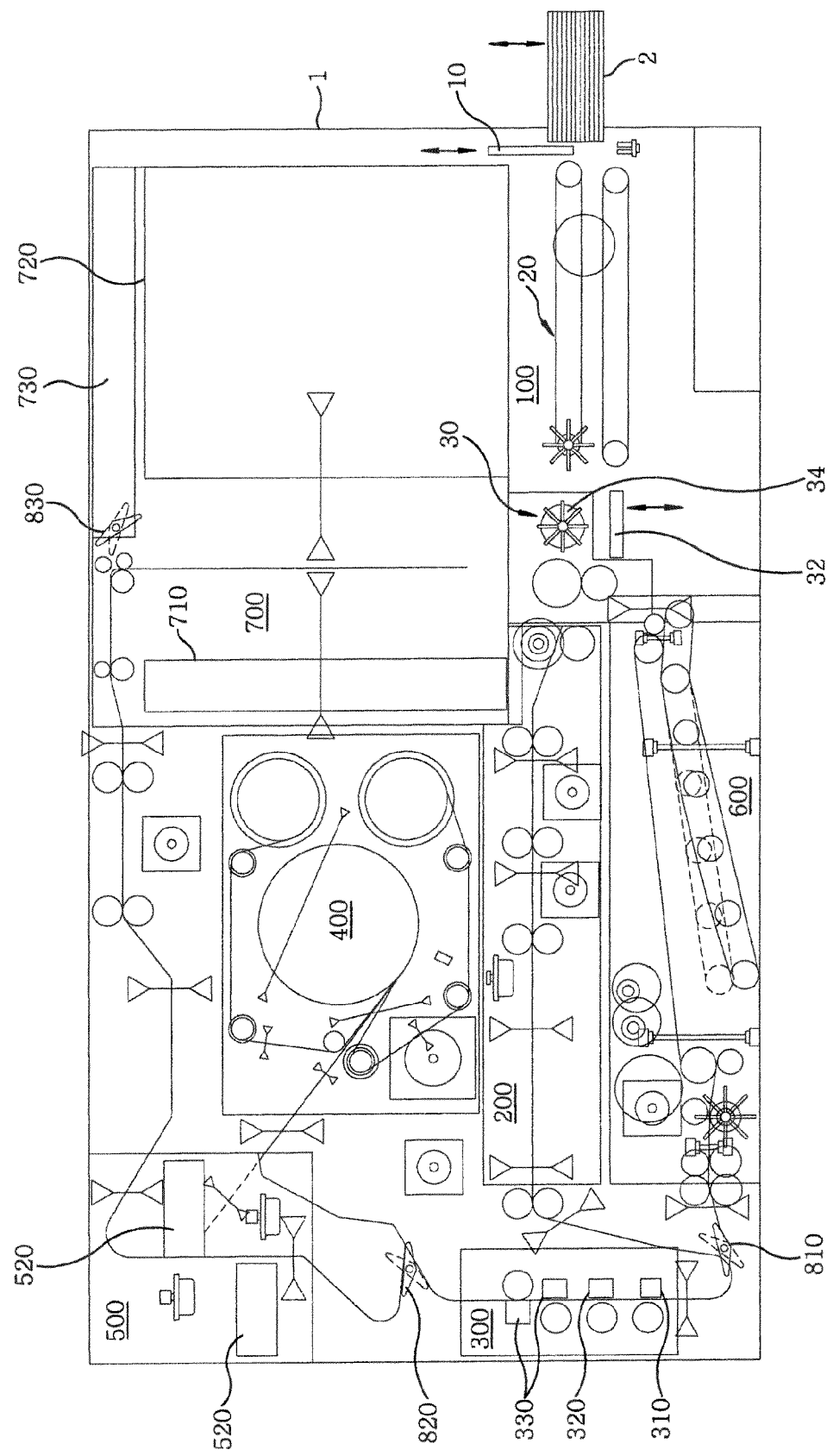
FIG. 1 is a schematic view illustrating a configuration of a bulk check acceptor in accordance with an embodiment of the present invention.

FIG. 1 is a schematic view showing a configuration of a bulk check acceptor in accordance with an embodiment of the present invention. The bulk check acceptor includes a bundle receiving module 100 arranged at a front and lower part of a rectangular parallelepiped acceptor body 1, an automatic alignment module 200 and a recognition module 300 that are sequentially placed at a rear part of the bundle receiving module 100, an escrow module 400 arranged over the automatic alignment module 200 in the center of the acceptor body 1, a print module 500 placed over the recognition module 300, a rejecting module 600 placed under the automatic alignment module 200, and a storage box module 700 placed at a front and upper part of the acceptor body 1. As shown in FIG. 1, the bulk check acceptor is closely packed.

When an insertion hole shutter 10 included in the rectangular parallelepiped acceptor body 1 is open, the bundle receiving module 100 draws a bundle of checks into the interior of the acceptor, and separates the bundle into individual checks and transfers the individual checks. The automatic alignment module 200 aligns and transfers the checks separated and transferred from the bundle receiving module 100. The recognition module 300 recognizes information on the checks automatically aligned and transferred by the automatic alignment module 200. The escrow module 400 escrows the checks whose information has been recognized by the recognition module 300. If the escrowed checks are approved for acceptance, the print module 500 endorses the checks and the endorsed checks are received in the storage box module 700. However, if the escrowed checks are rejected for acceptance, the rejecting module 600 discharges the rejected checks to the exterior of the bundle receiving module 100.

More specifically, when viewed from a side surface, the bundle receiving module 100 is located at a front and lower part of the acceptor body 1. The bundle receiving module 100 includes the insertion hole shutter 10 that is open by driving a pulse motor (not shown), an insertion unit 20 that transfers and draws a predetermined number of sheets of checks, e.g., a bundle of maximally fifties sheets of checks 2 in the interior of the acceptor in a low speed by driving a transfer motor (not shown) that clams and transfers the checks, and a separation unit 30 that separates and transfers the checks drawn in the insertion unit 20 one by one.

When the checks 2 drawn in a bundle from the insertion unit 20 are transferred to the separation unit 30, a bill press 32 included in the separation unit 30 rises to pressurize the transferred checks 2 and a separation member 34 rotates to separate the bundle into individual checks 2 by friction force. The separated check is transferred to the automatic alignment module 200 located at a rear part of the bundle receiving module 100.

The automatic alignment module 200 automatically aligns the check transferred from the bundle receiving module 100 on the basis of an end of either of the front or rear surface of the check and transfers the aligned check to the recognition module 300.

Meanwhile, the rejecting module 600 located under the automatic alignment module 200 receives checks to be rejected among the inserted bundle of checks 2. The checks to be rejected include damaged checks or unrecognized checks. The rejected checks are returned in a bundle through the bundle receiving module 100.

The recognition module 300 includes an MICR (Magnetic Ink Character Reader) 310, an MR (Magnetic Resonance) array 320, and a CIS (Contact Image Sensor) unit 330. The recognition module 300 is located substantially perpendicular to a rear part of the acceptor body 1. The MICR 310 reads a serial number, a face value, and the like that are printed on each of the transferred checks. The MR array 320 detects a magnetic component of a printed part of the check. The CIS unit 330 scans the front and rear surfaces of the check to recognize information on the check and then transfers the check to the escrow module 400.

The escrow module 400 is configured as a cassette tape and located in the center of the acceptor body 1, i.e. over the automatic alignment module 200, to escrow a predetermined number of sheets of bundled checks, for example, up to fifties sheets of checks.

After the checks are escrowed, images of the checks scanned by the CIS unit 330 of the recognition module 300 are displayed to a user, so that the user may transact the checks inserted into the acceptor body 1 while identifying the state of the displayed checks.

For example, when the user allows the acceptor to receive the whole displayed checks all at once or to selectively receive some of the displayed checks, the escrowed checks are separated and selected one by one, and then the selected check is transferred to the print module 500 located over the recognition module 300.

To provide an endorsement function irrespective of the direction of the check inserted through the bundle receiving module 100, that is, irrespective of whichever surface of the front and rear surfaces of the check is inserted first, the print module 500 includes a pair of ink units 520. Depending on the direction of the inserted check, one of the pair of ink units 520 prints endorsement characters on the check transferred from the escrow module 400 and then transfers the endorsed check to the storage box module 700.

When the user allows the acceptor to cancel the receipt of the whole displayed checks all at once after the checks are escrowed, the bundle of checks escrowed are separated and selected one by one, and then transferred through the recognition module 300 to the rejecting module 600 located under the automatic alignment module 200.

Meanwhile, by forming in the shape of a character "U" a transfer path provided between the automatic alignment module 200 and the recognition module 300 perpendicularly located at a rear part of the automatic alignment module 200, and between the recognition module 300 and the rejecting module 600 located under the automatic alignment module 200, the acceptor may be compactly configured. A first switching gate 810 is provided at the U-shaped transfer path.

Unlike cancelling all at once, when the user allows the acceptor to selectively cancel the receipt of some of the displayed checks after the checks are escrowed, the selected checks are transferred to the recognition module 300, and then to the rejecting module 600 via the first switching gate 810. For this purpose, a second switching gate 820 is provided at a transfer path between the print module 500 and the recognition module 300 and between the recognition module 300 and the escrow module 400.

The rejecting module 600 stores a predetermined number of sheets of rejected checks and discharges them to the exterior of the acceptor body 1 through the separation unit 30 and the insertion unit 20 of the bundle receiving module 100.

The storage box module 700 stores the checks endorsed by the print module 500. The storage box module 700 is located in the front and upper part of the acceptor body 1 in the shape of a door box. The storage box module 700 includes a first storage unit 710 and a second storage unit 720 that are located at left and right sides, respectively, which may selectively and perpendicularly store the endorsed checks-this is called "selective stacking function."

Assuming that about 2000 sheets of checks may be stored, the checks may be separately stored depending on the size or usage, for example, in such a manner that 200 sheets of personal checks each having small size and low usage are received in the first storage unit 710 and 1800 sheets of business checks each having relatively large size and high usage may be received in the second storage unit 720.

In addition, when the user does not withdraw a check which is returned by the rejecting module 600 to the insertion unit 20 of the bundle receiving module 100 because the check was damaged or unrecognizable, the storage box module 700 may have such a function as retracting the non-withdrawn checks. Referring to FIG. 1, a non-withdrawn check retracting box 730 is arranged over the second storage unit 720. For this purpose, a third switching gate 830 is provided at a front surface of the non-withdrawn check retracting box 730.

Although not specifically shown in the present invention, a stamp module of a roller-type may be selectively or optionally provided at a space for a transfer path between the print module 500 and the storage box module 700, that is, a space located over the escrow module 400. The stamp module may stamp the check endorsed by the print module 500.

Figure 2:
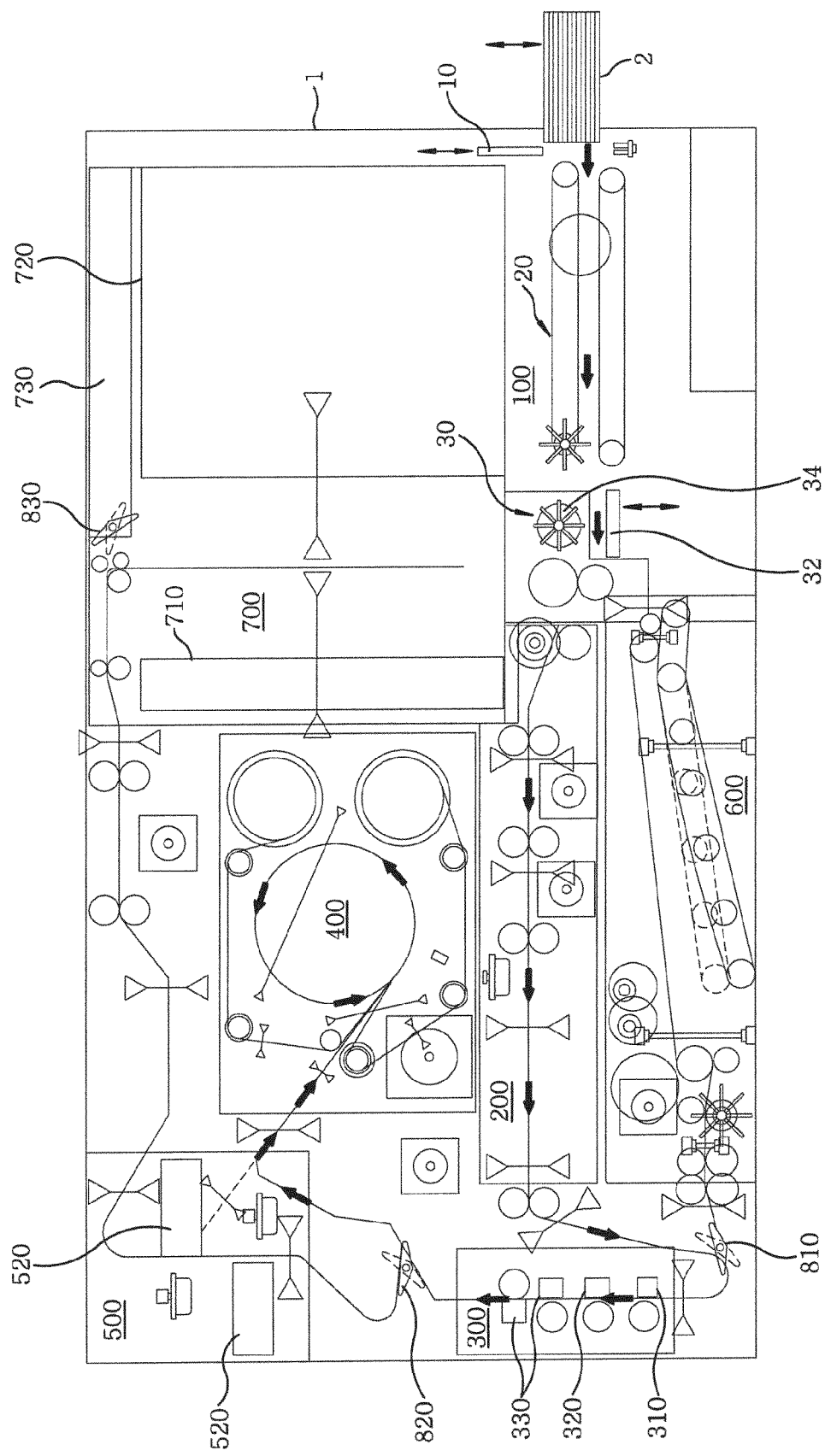
FIG. 2 is a view showing a transfer flow of checks from a bundle receiving module to an escrow module included in the bulk check acceptor shown in FIG. 1.

In the bulk check acceptor configured as above, as shown in FIG. 2, a bundle of checks 2 are inserted into the bundle receiving module 100 to be separated one by one, and then aligned by the automatic alignment module 200 on the basis of a front and right end. Thereafter, the checks pass through the first switching gate 810 and their information is read by the recognition module 300. Then, the checks are transferred to the escrow module 400 via the second switching gate 820.

Figure 3:
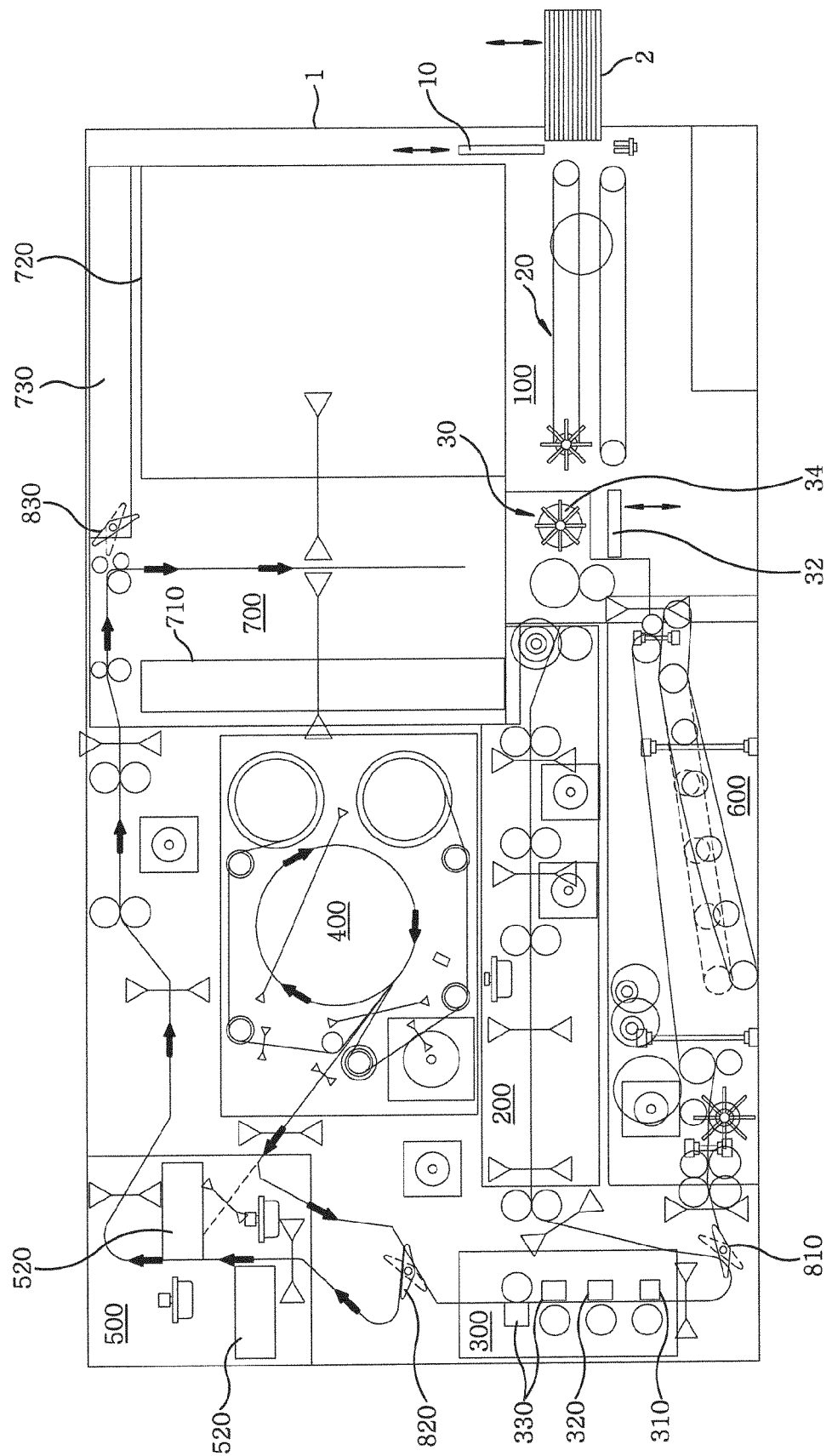
FIG. 3 is a view showing a receipt flow of checks from an escrow module to a storage box module included in the bulk check acceptor shown in FIG. 1.

Subsequently, as shown in FIG. 3, when the user allows the acceptor to receive the whole checks or selectively receive some of the checks after the checks are escrowed, the escrowed checks are transferred one by one to the print module 500 which in turn endorses the checks, and then selectively and perpendicularly stacked and received in one of the storage units 710 and 720 of the storage box module 700.

Figure 4:
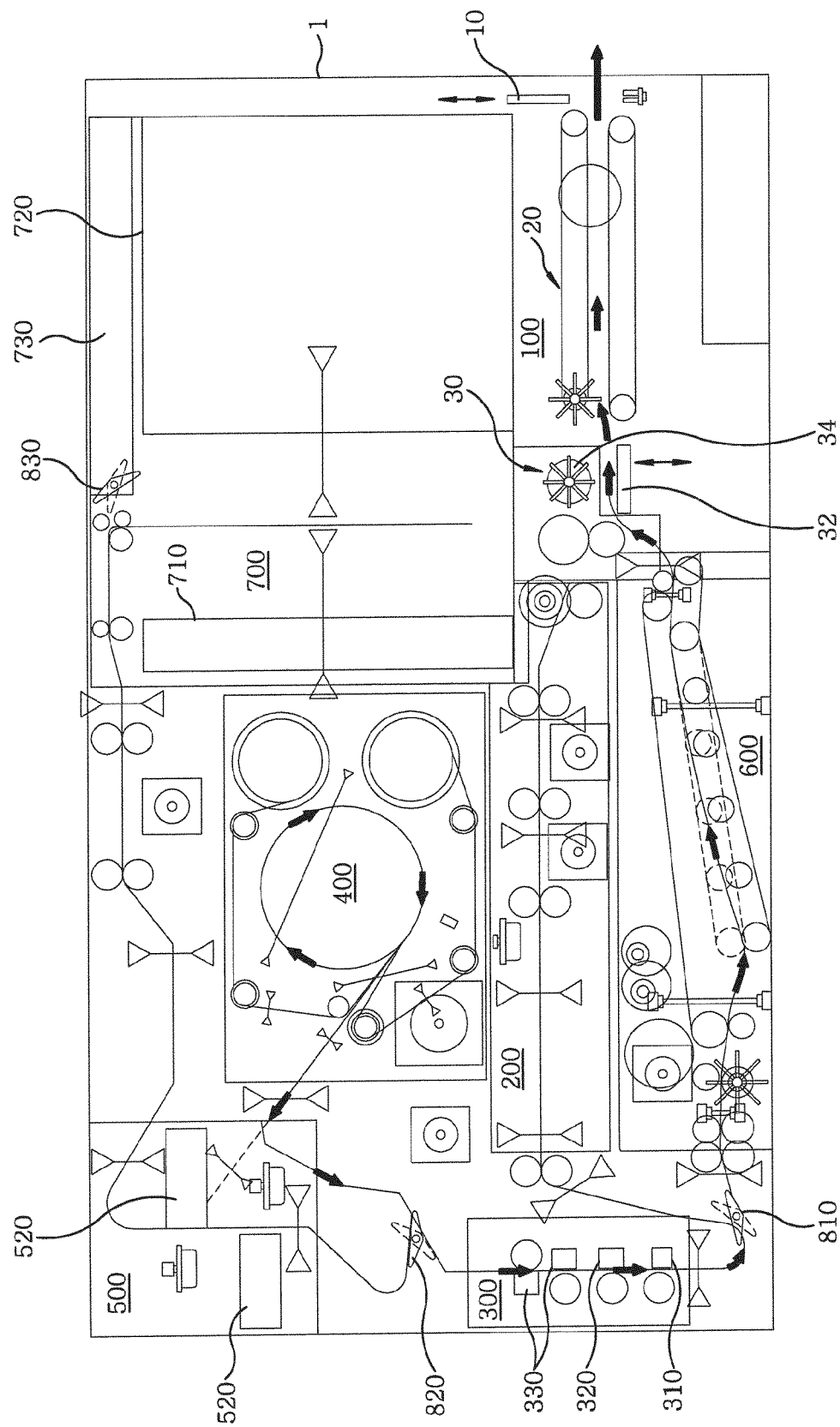
FIG. 4 is a view showing a transfer flow of checks when the receipt of checks is canceled in an escrow module included in the bulk check acceptor shown in FIG. 1.

Alternatively, when the user allows the acceptor to selectively cancel the receipt of some checks after the checks are escrowed, as shown in FIG. 4, selected ones among the escrowed checks are transferred not to the print module 500 but to the recognition module 300 by the second switching gate 820 and then passed through the rejecting module 600 by the first switching gate 810, so that the selected checks are discharged in a bundle to the exterior of the acceptor body 1 through the bundle receiving module 100.

Figure 5:
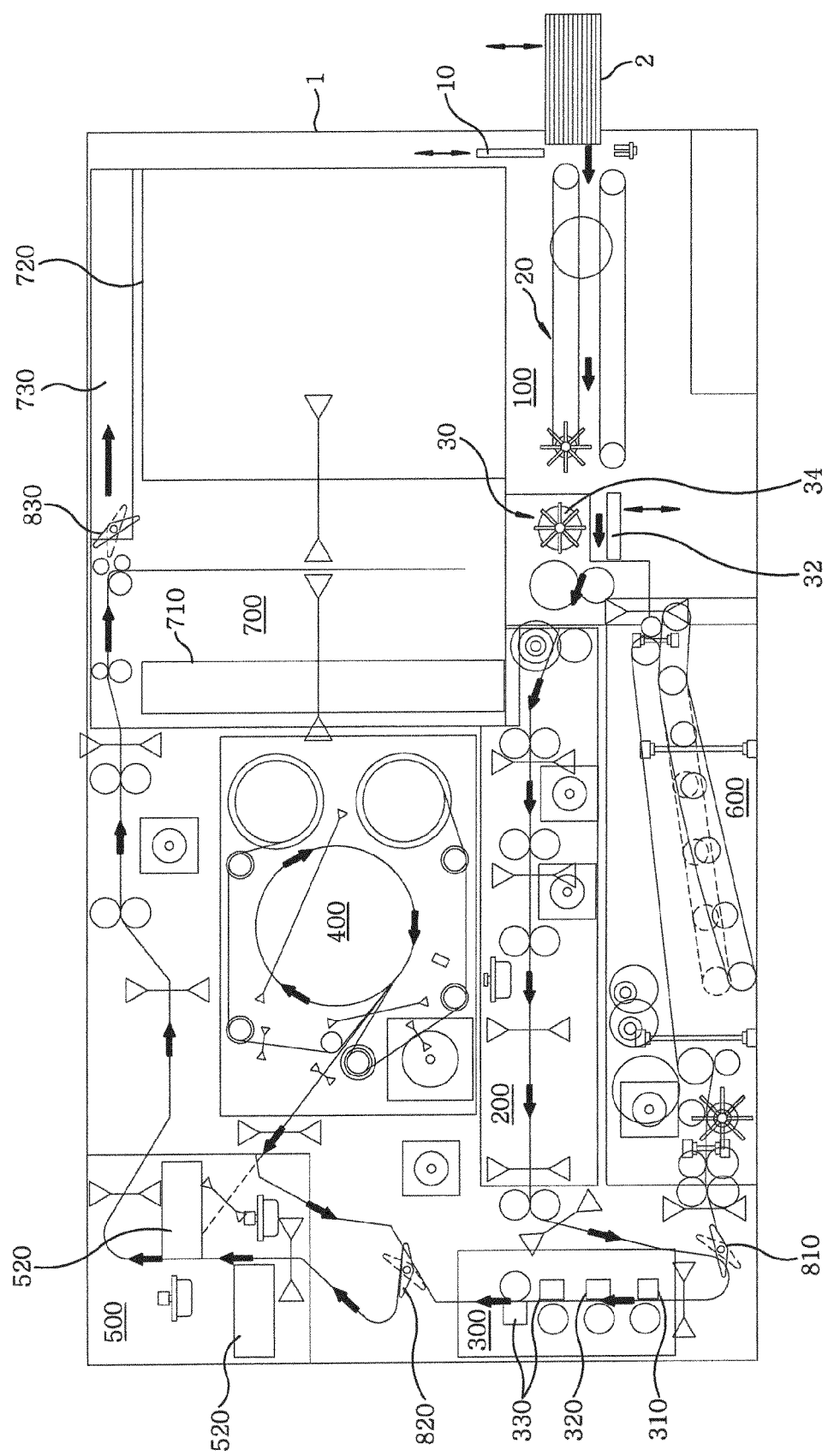
FIG. 5 is a view showing a retraction flow of checks which are not withdrawn in the bulk check acceptor shown in FIG. 1.

FIG. 5 depicts a flow of the bulk check acceptor retracting non-withdrawn checks. As shown in FIG. 5, when the checks discharged in a bundle are not withdrawn within a predetermined time, the non-withdrawn checks pass through the bundle receiving module 100, the automatic alignment module 200, and the recognition module 300 once more. Thereafter, the checks are re-escrowed by the escrow module 400 which in turns sequentially transfers the checks to the print module 500, same as in FIG. 2. Then, the non-withdrawn checks are retracted to the non-withdrawn check retracting box 730 by the third switching gate 830 located over the storage box module 700.

As described above, the present invention may accept checks in a bundle regardless of a size or direction of the checks and may efficiently arrange its components, thereby increasing convenience of usage and achieving implementation in a compact-size.

While the invention has been shown and described with respect to the embodiments, it will be understood by those skilled in the art that various changes and modification may be made without departing from the scope of the invention as defined in the following claims.

What is claimed is:

1. A bulk check acceptor comprising:
a bundle receiving module for receiving a bundle of checks and transferring individual checks in the bundle, the bundle receiving module located at a front lower part of an acceptor body;
an automatic alignment module located at a rear part of the bundle receiving module for aligning and transferring the individual checks transferred by the bundle receiving module;
a recognition module located at a rear part of the acceptor body for recognizing information on the checks aligned and transferred by the automatic alignment module, the recognition module further recognizing information on the individual checks to transfer the individual checks to an escrow module, the recognition module comprising:
 a MICR (Magnetic Ink Character Reader) for reading a serial number and a face value printed on each sheet of the checks transferred;
 a MR (Magnetic Resonance) array for detecting a magnetic component of the printed part; and
 a CIS (Contact Image Sensor) unit for scanning the front and rear surfaces of the check;
the escrow module located at a center of the acceptor body for escrowing the checks that were recognized;
a print module located over the recognition module for endorsing a check approved for acceptance;
a rejecting module located under the automatic alignment unit for discharging a rejected check through the bundle receiving module; and
a storage box module located at a front upper part of the acceptor body for receiving the endorsed check.

2. The bulk check acceptor of claim 1, wherein the bundle receiving module includes:
an insertion hole shutter for opening or closing an insertion hole;
an insertion unit for clamping a bundle of checks to draw the checks into the interior of the acceptor; and
a separation unit for individually separating the bundled checks into individual sheets of checks.

3. The bulk check acceptor of claim 1, wherein the automatic alignment module automatically aligns the individual checks transferred from the bundle receiving module by aligning edges of the individual checks, and transfers the aligned checks to the recognition module.

4. The bulk check acceptor of claim 1, wherein the escrow module is configured as a cassette tape to escrow a predetermined number of sheets of the checks, wherein when a user allows the acceptor to receive the entirety of the checks all at once or to selectively receive some of the checks while the escrowed checks are displayed to the user, the escrow module separates the escrowed checks one by one and then transfers the selected check to the print module.

5. The bulk check acceptor of claim 1, wherein the escrow module is configured as a cassette tape to escrow a predetermined number of sheets of the checks, wherein when a user allows the acceptor to cancel the receipt of the whole checks or selectively cancel the receipt of some of the checks while the escrowed checks are displayed to the user, the escrow module separates the escrowed checks one by one and then transfers the selected check to the rejecting module through the recognition module.

6. The bulk check acceptor of claim 4, wherein a first switching gate is provided at a U-shaped transfer path between the recognition module and the rejecting module and between the recognition module and the automatic alignment module, and a second switching gate is provided at a transfer path between the print module and the recognition module.

7. The bulk check acceptor of claim 5, wherein a first switching gate is provided at a U-shaped transfer path between the recognition module and the rejecting module and between the recognition module and the automatic alignment module, and a second switching gate is provided at a transfer path between the print module and the recognition module.

8. The bulk check acceptor of claim 1, wherein the print module includes a pair of ink units to print on the check for endorsing irrespective of insertion direction of the check, so that the print module prints endorsement on the check transferred from the escrow module and then transfers the endorsed check to the storage box module.

9. The bulk check acceptor of claim 1, wherein the storage box module is in shape of a door box and includes:
a first and a second storage units separately located at left and right side in the storage box module for performing a selective stacking function;
a non-withdrawn retracting box for retracting checks which are not withdrawn; and
a third switching gate provided at a front surface of the non-withdrawn retracting box.

10. The bulk check acceptor of claim 1, further comprising:
a stamp module in a space over the escrow module, the space provided for a transfer path between the print module and the storage box module.

* * * * *